Patented Dec. 18, 1923.

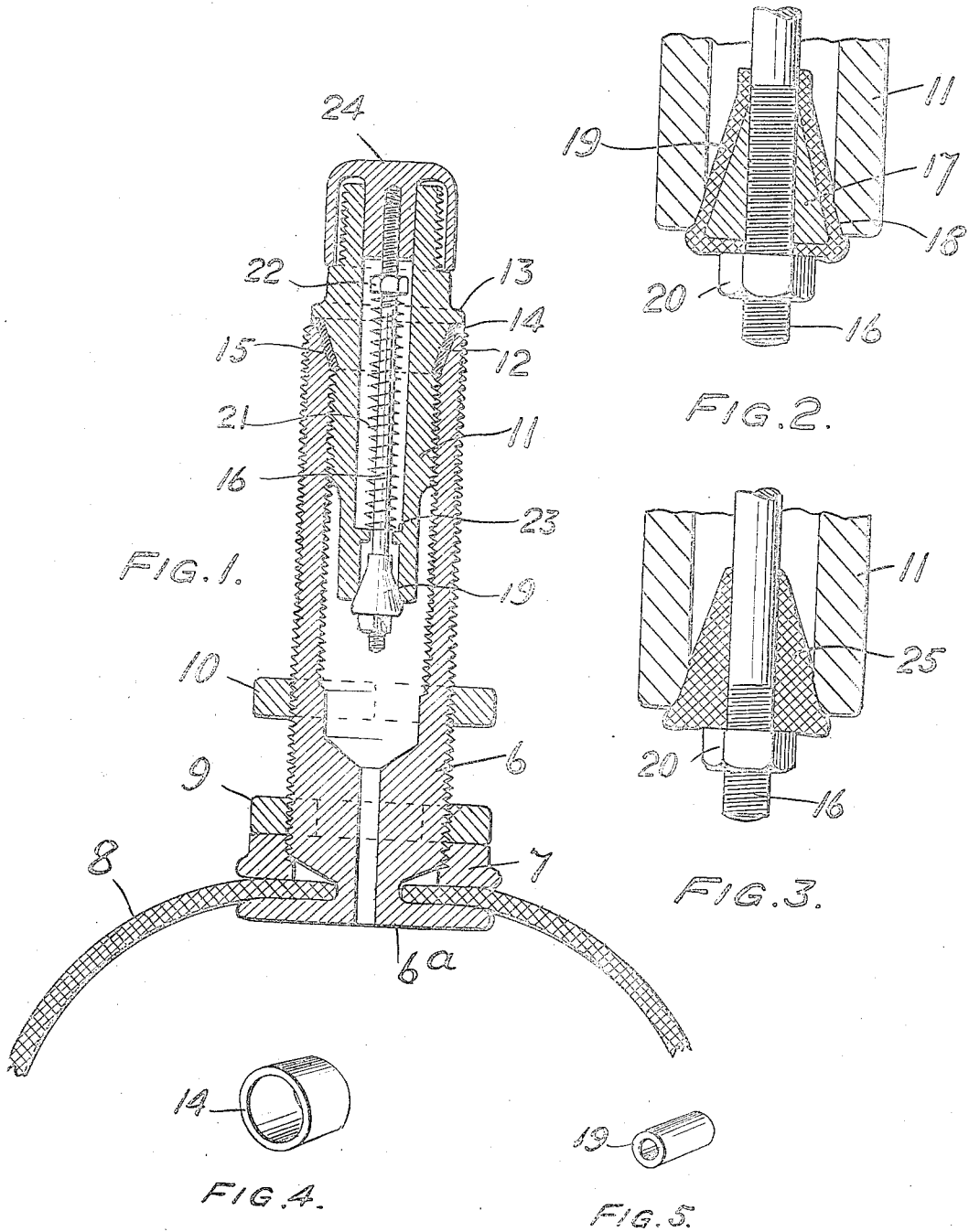

1,478,002

UNITED STATES PATENT OFFICE.

OLIVER W. EASTBURN, JR., OF KENNETT SQUARE, PENNSYLVANIA, ASSIGNOR TO EVAN B. SHARPLESS, OF AVONDALE, PENNSYLVANIA.

TIRE VALVE.

Application filed March 8, 1922. Serial No. 542,097.

*To all whom it may concern:*

Be it known that I, OLIVER W. EASTBURN, Jr., a citizen of the United States, residing at Kennett Square, county of Chester, and State of Pennsylvania, have invented a new and useful Improvement in Tire Valves, of which the following is a full, clear, and exact description, reference being had to the accompanying drawings, which form a part of this specification.

This invention relates to an improvement in valves for pneumatic tires.

The object of my invention is to provide a valve of this type which is simple of construction, readily applied and removed for renewing the gaskets, as well as a device having conical seats for the valve and nipple gaskets.

Another object of my invention is to provide conical seats on the nipple and valve stem so that I am enabled to cut the gaskets from rubber tubing, as well as the provision of means for holding the gaskets in position on the nipple and valve stem.

The precise nature of my invention will be best understood by reference to the accompanying drawings, which will now be described, it being premised, however, that various changes may be made in the details of construction without departing from the spirit and scope of my invention as defined in the appended claims.

Fig. 1 of the drawings is a sectional view through one form of valve made in accordance with my invention.

Fig. 2 is a detail sectional view on a larger scale of the valve shown in Fig. 1.

Fig. 3 is a view, similar to Fig. 2, of a modified form of valve.

Figs. 4 and 5 are perspective views of the gaskets.

In these drawings, the reference character 6 designates the air tube which is internally and externally threaded, the lower end thereof being provided with a head 6ª between which and a clamping member 7 is clamped the inner tube 8, which is to be inflated. 9 is a nut on the air tube 6 for drawing the head 6ª and clamping member 7 towards each other, and 10 is a second nut on the tube 6 for securing the tire to the rim.

11 is a nipple which is provided with external threads on both its upper and lower ends, and which is secured in position in the air tube by the threads on the lower end, which engage the internal threads in the air tube.

Seated on a conical portion 12 on the nipple 11 and between the threads on the lower end of the nipple and a flange 13 is a gasket 14, which is compressed between the seating portion 12 and a conical seat 15 on the air tube 6. As the seats for the gasket 14 are conical, the gasket is compressed both radially and longitudinally and as the gasket is relatively long, I am enabled to form an air-tight joint between the nipple and the air tube.

The included angles of conical portion 12 on the nipple and the seat are acute so that the greatest diameters of the gasket 13 are very little larger than the smallest diameters. This permits me to cut the gaskets from a tube of soft rubber, so that the cost for the manufacture of these gaskets is reduced to a minimum.

When it is desired to renew the gasket 14, it is only necessary to remove the nipple, cut or strip the gasket from the nipple, cut a gasket of the proper length from a rubber tube of the proper internal and external diameters, strip the gasket over the nipple from the lower end, and then screw the nipple home in the air tube.

Mounted within the nipple 11 is a valve stem 16, which is threaded at its upper and lower ends. Threaded on the lower end of the stem is a truncated cone 17 and arranged to be compressed between the member 17 and a tapered valve seat 18 is a soft rubber gasket 19. 20 is a nut for securing the gasket 19 in position on the stem 16. 21 is a spring surrounding the stem 16, which is interposed between a nut 22 on the upper end of the stem and an internal flange 23 in the nipple. The spring is arranged to retain the valve to its seat at all times except when air is admitted to the tire.

24 is a cap or closure engaging the thread on the upper end of the stem 16 and a flange or face of a wrench seat on the nipple 11, which will also assist in drawing the valve to its seat as well as form a protective cover for the upper end of the nipple.

In assembling the device, the truncated cone is first screwed onto the end of the spindle, the gasket is then stripped over the spindle and the cone to a point beyond the base of the cone, and as the gasket is stretched over the cone the lower end thereof will contract above the base of the cone. The nut 20 is then screwed home on the lower end of the spindle and clamp the lower end of the gasket 19 between it and the truncated cone. The valve stem is then inserted through the lower end of the nipple 11. Spring 21 is then positioned and the nut 22 applied and adjusted to give the proper tension to the spring. Gasket 14 is then applied to the nipple and the nipple is screwed home in the air tube.

The air tube is secured to the tire in the usual way and the tire is inflated by connecting the air supply tube to the threaded upper end of the nipple. After inflation, the supply tube is removed and the cap 24 is applied to the upper end of the valve stem, which will draw the valve against the seat and form a perfectly air-tight seal.

If desired, I may provide a soft rubber valve in the form of truncated cone, as shown at 24 in Fig. 3.

The advantages of my invention result from the provision of a tire valve having a gasket of conical form between the nipple and the air tube which is arranged to be compressed radially and longitudinally between the nipple and the air tube and which is seated in a recess on the nipple having a conical wall. Also from the provision of a valve having a conical seat and a compressible valve arranged to be drawn to its seat by a spring and the sealing cap when closed; as well as from the provision of gaskets for sealing the joint between the nipple and the air tube and for covering the conical metal portion of the valve, which can be cut from tubes of soft rubber.

Having now fully described my invention, what I claim and desire to protect by Letters Patent is:—

1. A tire valve having a tubular casing, a conical valve seat, a valve stem, a conical valve member on the stem, a rubber sleeve on the valve member having a radial skirt engaging the face of the valve member at the larger end, and a securing device for compressing the skirt between the valve member and the securing device.

2. A tire valve having a tubular casing, a conical valve seat, a valve stem, a conical valve member on the stem, a tension spring surrounding the stem for holding the valve to its seat, the stem having a threaded end, a cap for the valve for engaging the threads on the stem, a rubber sleeve on the valve member having a radial skirt engaging the face of the valve member at the larger end, and a securing device compressing the skirt between the valve member and the securing device.

In testimony of which invention, I have hereunto set my hand, at Philadelphia, Pa., on this 19th day of January, 1922.

OLIVER W. EASTBURN, Jr.